US006876694B2

(12) United States Patent
Komatsu

(10) Patent No.: US 6,876,694 B2
(45) Date of Patent: Apr. 5, 2005

(54) METHOD AND APPARATUS FOR DECODING SPREAD SPECTRUM SIGNAL FOR CDMA

(75) Inventor: Masahiro Komatsu, Tokyo (JP)

(73) Assignee: Nec Corporation, Tokyo (JP)

(*) Notice: Subject to any disclaimer, the term of this patent is extended or adjusted under 35 U.S.C. 154(b) by 743 days.

(21) Appl. No.: 09/794,697

(22) Filed: Feb. 26, 2001

(65) Prior Publication Data

US 2001/0022808 A1 Sep. 20, 2001

(30) Foreign Application Priority Data

Mar. 15, 2000 (JP) .................................... 2000-072050

(51) Int. Cl.⁷ .............................................. H04B 1/707
(52) U.S. Cl. ..................... 375/148; 375/144; 375/346
(58) Field of Search ............................... 375/148, 144, 375/346, 152, 365, 147, 150, 347, 262, 232; 370/342, 335, 480, 491; 455/25, 561, 522

(56) References Cited

U.S. PATENT DOCUMENTS 6,304,624 B1 * 10/2001 Seki et al. .................. 375/365
6,678,309 B1 * 1/2004 Kitahara ..................... 375/144

FOREIGN PATENT DOCUMENTS

| EP | 0 966 247 A1 | 4/2000 |
|----|--------------|--------|
| JP | H7-231285 | 8/1995 |
| JP | 08-084096 | 3/1996 |
| JP | 10-051424 | 2/1998 |
| JP | 10-233756 | 9/1998 |
| JP | 11-154930 | 6/1999 |
| JP | 11-186990 | 7/1999 |
| JP | 2000-4212 | 1/2000 |
| WO | WO 99/55033 | 10/1999 |

OTHER PUBLICATIONS

Abeta, et al., "Performance Comparison between Time–Multiplexed Pilot Channel and Parallel Pilot Channel for Coherent Rake Combining in DS–CDMA Mobile Radio", IEICE, Trans. Commun., vol. E–81–B, No. 7 (1998).

S. Abeda, et al., "The Performance of Channel Estimation Method Using Adaptive Weighted Multi–Symbol Averaging (WMSA) with Pilot Channel in DS–CDMA", The Institute of Electronics, Information and Communication Engineers, vol. 98, No. 21 (1998).

H. Andoh, et al., "Performance of Pilot Symbols–Assisted Coherent RAKE Receiver Using Weighted Multi–Slot Averaging for DS–CDMA Mobile Radio", The Institute of Electronics, Information and Communication Engineers, vol. 97, No. 194 (1997).

* cited by examiner

Primary Examiner—Shuwang Liu
Assistant Examiner—Ted M Wang
(74) Attorney, Agent, or Firm—Scully, Scott, Murphy & Presser

(57) ABSTRACT

An object of the present invention is to estimate and compensate more accurately transmission channels in CDMA signal decoding. Memory means stores received despread data. Slot position detection means detects positions of pilot symbols. Pilot symbol averaging means obtains transmission channel estimation value per pilot block, by averaging a plurality of reception channels in each pilot block. The transmission channel estimation values are delayed by delay means, multiplied by their weight and added by multi-pilot block transmission channel estimation means. Here, the weighs are controlled adaptively by weight determination means in accordance with the state of the channel. Channel compensation means compensate m-th information symbol in the n-th slot including the pilot block on the basis of the estimation values obtained by the multi-pilot block transmission channel estimation means.

4 Claims, 6 Drawing Sheets

FIG. 3

[ WHEN j-th SLOT FLUCTUATES GREATLY ]

| (j-3)-th SLOT | (j-2)-th SLOT | (j-1)-th SLOT | j-th SLOT | (j+1)-th SLOT | (j+2)-th SLOT | (j+3)-th SLOT |
|---|---|---|---|---|---|---|
| $\alpha_3 = 0.15$ | $\alpha_3 = 0.18$ | $\alpha_3 = 0.23$ | $\alpha_3 = 0.00$ | $\alpha_3 = 0.00$ | $\alpha_3 = 0.00$ | $\alpha_3 = 0.15$ |
| $\alpha_2 = 0.17$ | $\alpha_2 = 0.20$ | $\alpha_2 = 0.25$ | $\alpha_2 = 0.00$ | $\alpha_2 = 0.00$ | $\alpha_2 = 0.20$ | $\alpha_2 = 0.17$ |
| $\alpha_1 = 0.18$ | $\alpha_1 = 0.21$ | $\alpha_1 = 0.26$ | $\alpha_1 = 0.00$ | $\alpha_1 = 0.26$ | $\alpha_1 = 0.21$ | $\alpha_1 = 0.18$ |
| $\alpha_0 = 0.18$ | $\alpha_0 = 0.21$ | $\alpha_0 = 0.26$ | $\alpha_0 = 0.36$ | $\alpha_0 = 0.26$ | $\alpha_0 = 0.21$ | $\alpha_0 = 0.18$ |
| $\alpha_{-1} = 0.17$ | $\alpha_{-1} = 0.20$ | $\alpha_{-1} = 0.00$ | $\alpha_{-1} = 0.34$ | $\alpha_{-1} = 0.25$ | $\alpha_{-1} = 0.20$ | $\alpha_{-1} = 0.17$ |
| $\alpha_{-2} = 0.15$ | $\alpha_{-2} = 0.00$ | $\alpha_{-2} = 0.00$ | $\alpha_{-2} = 0.30$ | $\alpha_{-2} = 0.23$ | $\alpha_{-2} = 0.18$ | $\alpha_{-2} = 0.15$ |

METHOD AND APPARATUS FOR DECODING SPREAD SPECTRUM SIGNAL FOR CDMA

BACKGROUND OF THE INVENTION

1. Technical Field of the Invention

The present invention relates to a method and apparatus for decoding CDMA (code division multiple access) signal, and particularly to a method and apparatus for decoding a direct sequence spread spectrum signal which is modulated by pseudo noise codes of which rate are higher than the information signal rate.

2. Description of the Prior Art

Amplitude and phase fluctuation occur in a mobile communication system, due to Rayleigh fading caused by a relative movement between a mobile station and a base station. One of the methods for estimating and compensating the fading distortion is to use pilot symbols which are inserted between information symbols with a constant period. In this case, the phases of the pilot symbols are known.

Concretely, a pilot symbol of which transmission phase is known is inserted per a plurality of information symbols on a communication channel, thereby estimating a transmission channel on the basis of the phase of the received pilot symbol. The fluctuation of the transmission channel between the pilot symbols is estimated and compensated by measuring the amplitude and phase in each path in a prescribed period of the information symbol between the front pilot symbol and the rear pilot symbol.

Further, the transmission channel is estimated more accurately by using a lot of pilot symbols for a lot of time slots, as disclosed in JP 10-51424 A (1998) and JP 11-186990 A (1999).

FIG. 4 is a block diagram of the receiver as disclosed in JP 11-186990 A (1999). FIG. 5 is a block diagram of multi-pilot block channel estimation unit 8 as shown in FIG. 4. As shown in FIG. 4, matched filter 2 despreads the data inputted from reception data input terminal 1, on the basis of receiving timing of each multi-path. "2k" slots from the (n−(k−1))−th slot to the (n+k)−th slot in the despread data are stored in memory 3. Here, "n" is a non-negative integer and "k" is a positive integer.

The slot comprises a pilot block, TPC (transmission power control) information and transmission data. Further, the pilot block includes a plurality of pilot symbols, for example, three symbols as shown in FIG. 5.

Memory 3 may stores only the pilots blocks of the received slots. The positions of the pilot symbols are detected by slot position detection unit 4 which picks up the pilot blocks from memory 3. Then, pilot symbol averaging unit 5 averages a plurality of received channels at a plurality of the pilot symbols in a slot. The amplitude of the received signal varies slot by slot, because of the TPC, even when there is not any fluctuation on the transmission channel. Therefore, the amplitude variation due to the TPC may be compensated. The transmission timings by the pilot blocks are arranged by delay unit 6.

Multiple-pilot block channel estimation unit 8 multiplies the transmission channel estimation value of each pilot block by weight coefficient and adds them. The result of the addition is a complex channel estimation value. Then, multiplier 10 multiples the data from memory 3 by the complex conjugate of the complex channel estimation value in order to compensate the fading phase fluctuation of each information symbol. The signals outputted from multiplier 10 is combined with other RAKE fingers by RAKE combining unit 11. The result of the RAKE combining is outputted from decoded data output terminal 12 of RAKE combining unit 11.

On the other hand, the output from delay unit 6 is inputted as a transmission channel estimation value of the TPC symbol into TPC command determination unit 9 in order to compensate the fluctuations of fading phase due to TPC.

The operation of the above-mentioned conventional CDMA signal decoding is explained. Output 301 from pilot symbol averaging unit 5 is an average of the received channels at a plurality of pilot symbols. The average means a transmission channel estimation value for each pilot block. The average for each pilot block, in other words, a complex fading trajectory estimation value is expressed by $$\xi1(n+k), \ldots, \xi1(n+1)\,\xi1(n), \ldots, \xi1(n-(k-1)).$$

The pilot blocks are inputted into multipliers 385, 390, 395, 396 and 397 through pilot symbol averaging unit 5 and delay units 320, 325, 330, 335 and 340, respectively. Further, output 301 from pilot symbol averaging unit 5 is inputted into multiplier 380. Multipliers 380 385 390, 395, 396 and 397 multiply output 301 by weights $\alpha_k, \alpha_2, \alpha_1, \alpha_0, \alpha_{-1}, \alpha_{(-k+1)}$. The outputs from the multipliers are added by adder 398 in order to obtain $\xi1(m,n)$ which is a transmission channel estimation value of the m-th information symbol in the n-th slot.

The conventional method for estimating the transmission channel is shown in FIG. 6. As shown in FIG. 6, the transmission channel estimation values obtained by using the pilot symbols are plotted on the I-Q coordinates, where I is an in-phase component and Q is a quadrature component. Each point is plotted by a single value estimated in a slot. The trajectory varies greatly at a fast fading, while the trajectory varies a little at a slow fading, as shown in FIG. 6.

Weights $\alpha_k, \alpha_2, \alpha_1, \alpha_0, \alpha_{-1}, \alpha_{(-k+1)}$ are constant in FIG. 6 in order to improve the accuracy of estimation against thermal noise and interference signal.

Although the slow fading when the transmission channel is stable is followed well, it is not easy to follow the fast fading, when the number of slots "2k" increases and the weights are of the same order.

On the contrary, when the number of slots "2k" decreases and the weights are set up to be approximately zero except specific slots, it is not easy to follow the slow fading, because the thermal noise and interference do not become negligible, although the fast fading can be followed well.

SUMMARY OF THE INVENTION

An object of the present invention is to estimate and compensate more accurately the transmission channel, even when its fluctuation is slow or fast, in the decoding of the CDMA signal.

The decoding apparatus for direct sequence spectrum spread signal for CDMA of the present invention comprises a memory for storing pilot blocks, a pilot symbol averaging unit for averaging a plurality of received channels per pilot block, a weight determination unit for determining weights for transmission channel estimation values per pilot block, a multi-pilot block channel estimation unit for obtaining transmission channel estimation values for information symbols in each slot, and a transmission channel fluctuation compensation unit for compensating the fluctuation of the information symbols. The decoding apparatus of the present invention estimates and compensate more accurately the transmission channel, by adjusting the weights, even when the fluctuation is slow or fast.

Concretely, the memory stores "2k" pilot blocks from (n−(k−1))-th pilot block to (n+k)-th pilot block which includes a plurality of pilot symbols in a sequence of slots. Here, "n" is a non-negative integer and "k" is a positive integer.

Further, the pilot symbol averaging unit averages a plurality of received channels at a plurality of the pilot symbols in a slot.

Further, the weight determination unit for determining the weights which are used for obtaining a weighted average of the transmission channel estimation values per pilot block. Here, the weighted average is calculated over the "2k" slots. The weights are determined in accordance with the state of transmission channel.

Further, the multi-pilot block transmission channel estimation unit obtains the transmission channel estimation values for the m-th information symbol in the n-th slot, on the basis of the weighted average.

Further, the transmission channel fluctuation compensation unit compensates the transmission channel fluctuation of the m-th information symbol in the n-th slot, on the basis of transmission channel estimation values obtained by the multi-pilot block transmission channel estimation unit.

Furthermore, the weight determination unit may narrow the range of dominant weights, when the transmission channel is unstable, while it may enlarge the range of dominant weights, when the transmission channel is stable.

Furthermore, the weight determination unit may decrease the weights for the slots which go ahead specific slots of which states fluctuate greatly.

The decoding method for direct sequence spectrum spread signal for CDMA of the present invention comprises the steps of storing pilot blocks, averaging a plurality of received channels per pilot block, determining weights for transmission channel estimation values per pilot block, obtaining channel estimation values for information symbols in each slot, and compensating the fluctuation of the information symbols. The decoding method of the present invention estimates and compensate more accurately the transmission channel, by adjusting the weights, even when the fluctuation is slow or fast.

Concretely, the storing step is the step for storing "2k" pilot blocks from (n−(k−1))-th pilot block to (n+k)-th pilot block which includes a plurality of pilot symbols in a sequence of slots. Here, "n" is a non-negative integer and "k" is a positive integer.

Further, the averaging step is the step for averaging a plurality of received channels at a plurality of the pilot symbols in a slot.

Further, the determining step is the step for determining the weights which are used for obtaining a weighted average of the transmission channel estimation values per pilot block. Here, the weighted average is calculated over the "2k" slots. The weights are determined in accordance with the state of transmission channel.

Further, the obtaining step is the step for obtaining transmission channel estimation values for the m-th information symbol in the n-th slot, on the basis of the weighted average.

Further, the compensation step is the step for compensating the transmission channel fluctuation of the m-th information symbol in the n-th slot, on the basis of transmission channel estimation values.

Furthermore, the weight determination unit may narrow the range of dominant weights, when the transmission channel is unstable, while it may enlarge the range of dominant weights, when the transmission channel is stable.

Furthermore, the weight determination unit may decrease the weights for the slots which go ahead specific slots of which states fluctuate greatly.

According to the present invention, the transmission channel is estimated and compensated more accurately, by calculating a weighted average of the transmission channel estimation value in each slot containing the pilot block, wherein the weights are determined adaptively on the basis of the state of transmission channel.

BRIEF EXPLANATION OF THE DRAWINGS

FIG. 3 is another exemplary table of weights for slots including pilot block.

PREFERRED EMBODIMENT OF THE INVENTION

Figure 1:
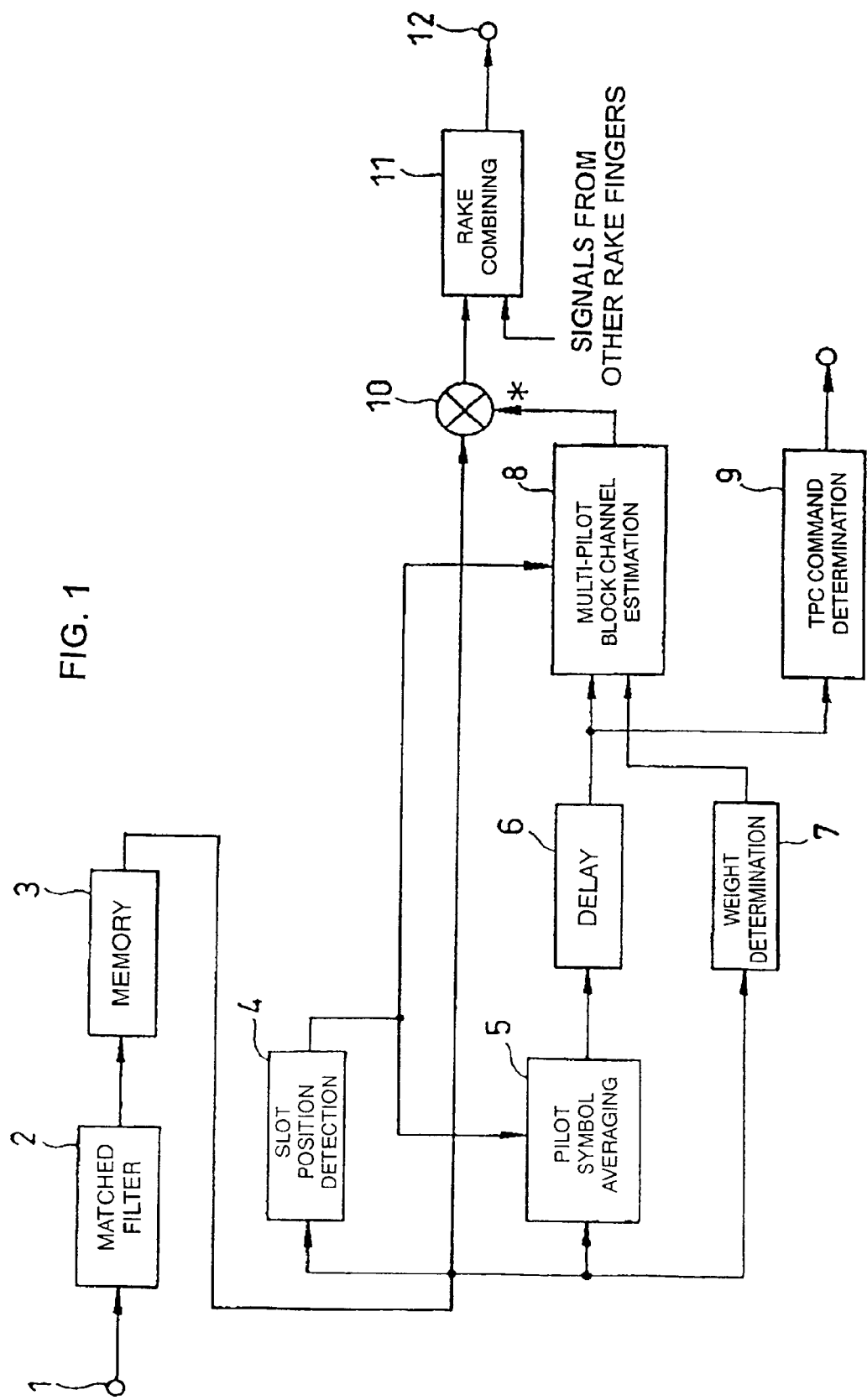
FIG. 1 is a block diagram of the CDMA signal decoding apparatus of the present invention.
Figure 6:
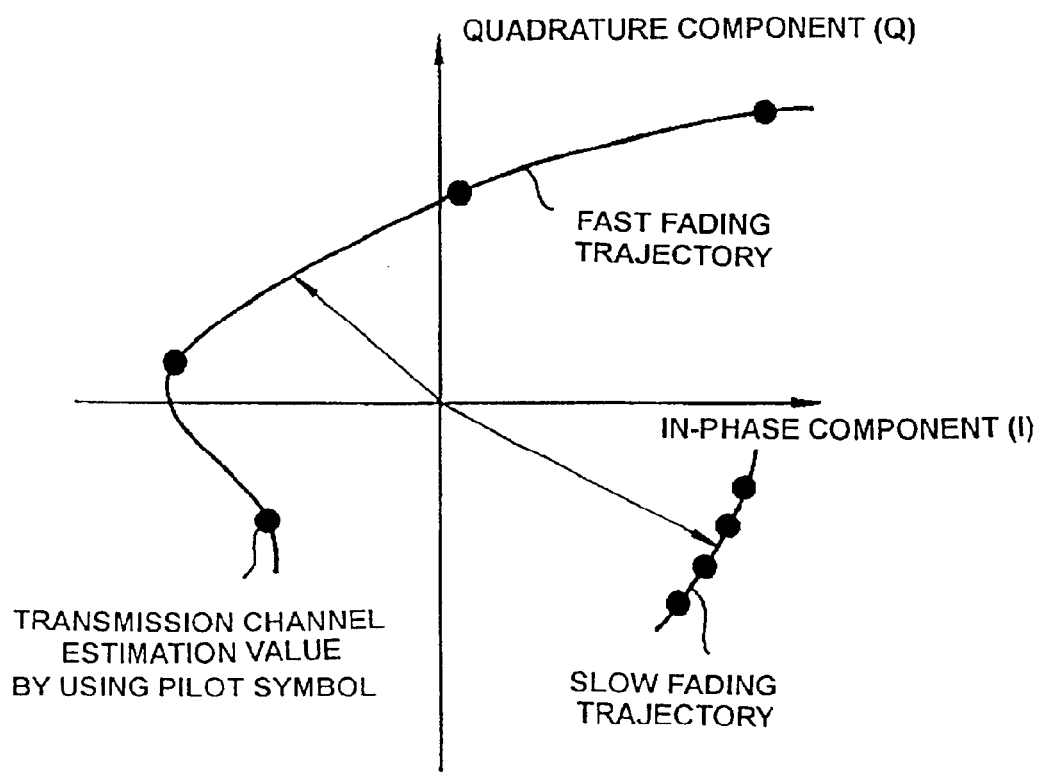
FIG. 6 is a plot of transmission channel estimation value on I-Q coordinates illustrating a fast fading trajectory and a slow fading trajectory.

FIG. 1 is a block diagram of the decoding apparatus of the present invention. The reference numerals as shown in FIG. 6 are used. Matched filter 2 despreads the received data from reception data input terminal 1 on the basis of the reception timings of multi-paths. The despread datas from (n−(k−1)) th slot to (n+k)-th slot are stored in memory 3. Memory 3 may stores only the pilot blocks in the slots.

Slot position detection unit 4 detects the positions of the pilot symbols. Then, pilot symbol averaging unit 5 averages a plurality of received channels at a plurality of the pilot symbols in a slot. The amplitude of the received signal varies slot by slot, because of the TPC, even when there is not any fluctuation on the transmission channel. Therefore, the amplitude variation due to the TPC may be compensated.

The transmission timings by the pilot blocks are arranged by delay unit 6. On the other hand, weight determination unit 7 determines the weights for averaging the transmission channel estimation values per pilot block outputted from pilot symbol averaging unit 5. For the weight determination, weight determination unit 7 monitors the data in memory 3, and determines the weights on the basis of the monitoring result.

Multiple pilot block transmission channel estimation unit 8 multiplies the transmission channel estimation value per pilot block by weight coefficient determined by weight determination unit 7 and adds them. The result of the addition is a complex transmission channel estimation value. Then, multiplier 10 multiples the data from memory 3 by the complex conjugate of the complex transmission channel estimation value in order to compensate the fading phase fluctuation of each symbol. The signals outputted from multiplier 10 is combined with other RAKE fingers by RAKE combining unit 11. The result of the RAKE combining is outputted from decoded data output terminal 12 of RAKE combining unit 11.

The output from delay unit 6 is inputted as transmission channel estimation value of the TPC symbol into TPC command determination unit 9 in order to compensate the fluctuations of fading phase in TPC.

Weight determination unit 7 narrows the range of the dominant weights, when the transmission channel fluctuates rapidly, while it enlarges the range of the donimant weights, when the transmission channel is stable. The state of the transmission channel is monitored on the basis of the interference level in the data in memory 3 or a number of times which the data level cross a reference value, because the state of the transmission channel fluctuates greatly, when the interference level is high, or the number of crossing per unit time is great.

Figure 2:
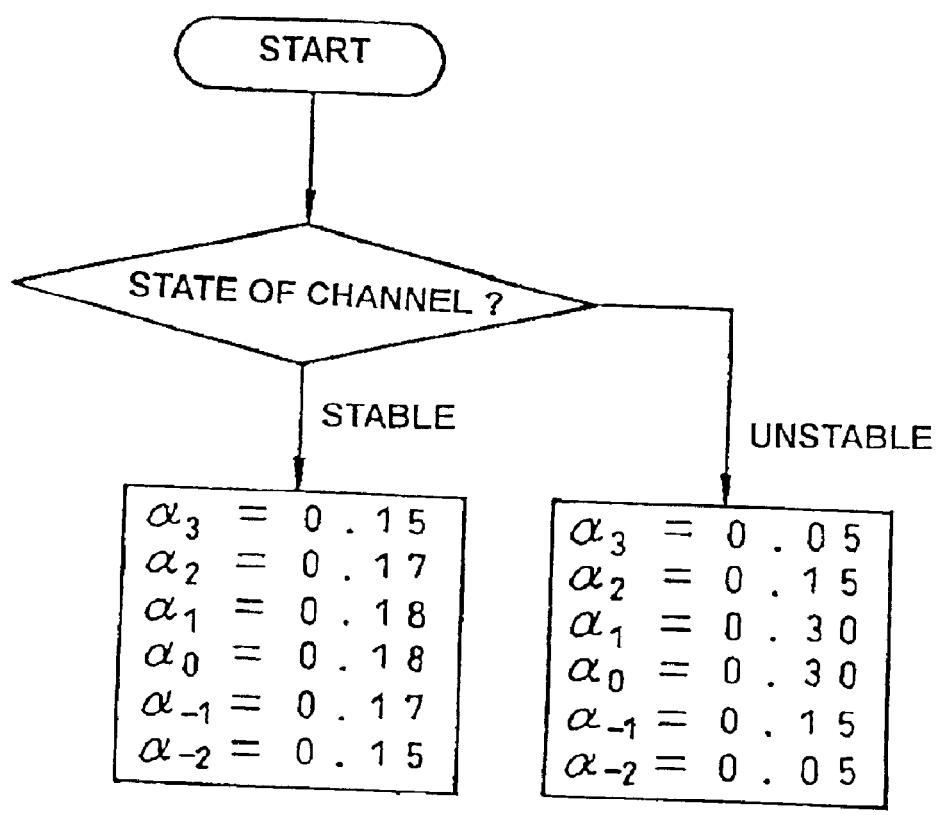
FIG. 2 is a flow chart for explaining an operation of weight determination unit 7. An exemplary table of weights for slots including pilot block.
Figure 4:
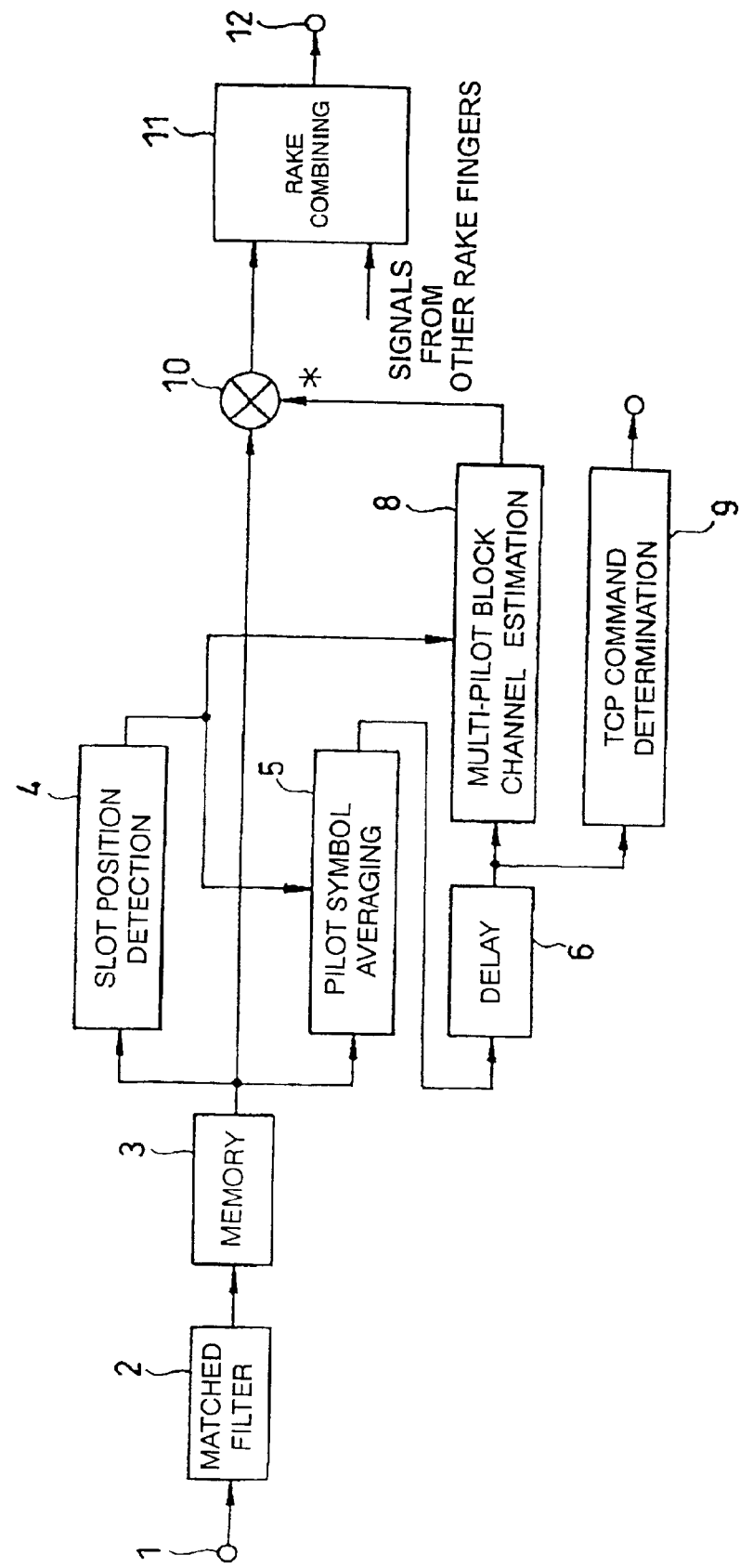
FIG. 4 is a block diagram of a conventional CDMA signal decoding apparatus.
Figure 5:
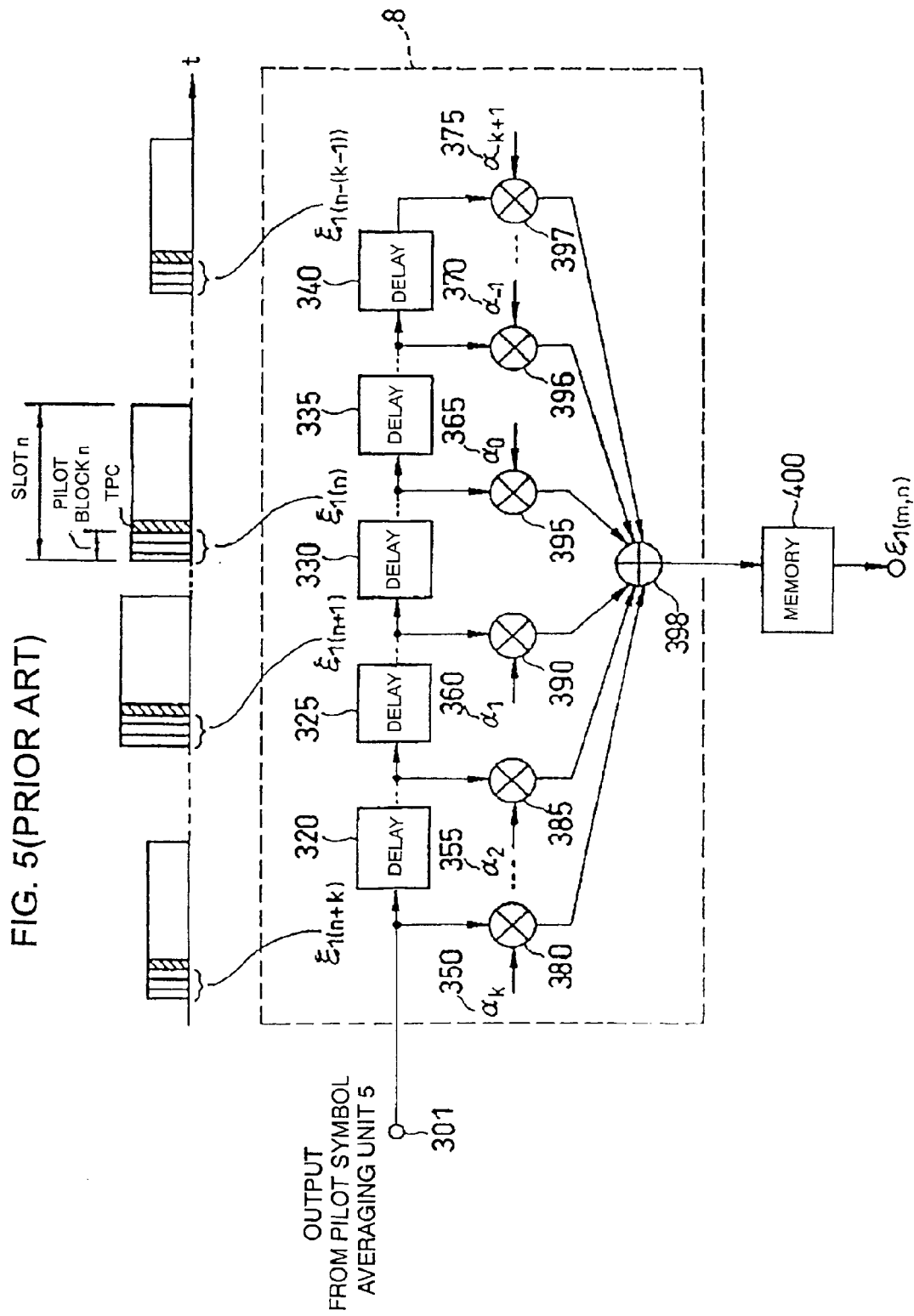
FIG. 5 is a block diagram of multi-pilot block transmission channel estimation unit 8 as shown in FIG. 4.

FIG. 2 is a flow chart for determining the weights when "k"=3. The weights are determined to be of the same order such as $\alpha_3=0.15$, $\alpha_2=0.17$, $\alpha_1=0.18$, $\alpha_0=0.18$, $\alpha_{-1}$ 0.17, $\alpha_{-2}=0.15$, when the transmission channel is stable. On the other hand, the weights are determined to decrease as they are away from the dominant weights, such as $\alpha_3=0.05$, $\alpha_2=0.15$, $\alpha_1=0.30$, $\alpha_0=0.30$, $\alpha_{-1}$ 0.15, $\alpha_{-2}=0.05$, when the transmission channel is unstable and fluctuates greatly. The state of transmission channel may be divided into several states, for example, slow fading, medium fading and fast fading. Further, the weight may be linearly changed in response to the state of transmission channel.

FIG. 3 is another example of the weights determined by weight determination unit 7 on the basis of the data level in memory 3. It is assumed that the j-th slot fluctuates greatly, when the data level exceeds a reference value. In this case, the weights for the slots which go in front of the j-th slot in the time axis are decreased. As shown in FIG. 3, the weights for the (j−3)-th slot, the (j−2)-th slot and the (j−1)-th slot which go ahead of the j-th slot are decreased.

For example, the weights may be varied in such a manner that:

for the (j−3)-th slot
$\alpha_3=0.15$, $\alpha_2=0.17$, $\alpha_1=0.18$, $\alpha_0=0.18$, $\alpha_{-1}$ 0.17, $\alpha_{-2}=0.15$ for the (j−2)-th slot
$\alpha_3=0.18$, $\alpha_2=0.20$, $\alpha_1=0.21$, $\alpha_0=0.21$, $\alpha_{-1}$ 0.20, $\alpha_{-2}=0.00$ for the (j−1)-th slot
$\alpha_3=0.23$, $\alpha_2=0.25$, $\alpha_1=0.26$, $\alpha_0=0.26$, $\alpha_{-1}$ 0.00, $\alpha_{-2}=0.00$ The reference for data level may be varied adaptively on the basis of the interference level. Further, when only one slot fluctuates greatly, only the weight for the fluctuated slot may be decreased.

Further, the table of weights may be stored in a read-only-memory, thereby reading out it in response to the state of transmission channel.

What is claimed is:

1. A decoding apparatus for direct sequence spread spectrum signal for CDMA which comprises:
   memory means for storing "2k" pilot blocks from (n−(k−1))-th pilot block to (n+k)-th pilot block which includes a plurality of pilot symbols in a sequence of slots, where "n" is a non-negative integer and "k" is a positive integer;
   pilot symbol averaging means for averaging a plurality of received channels at a plurality of the pilot symbols in a slot;
   weight determination means for determining the weights which are used for obtaining a weighted average of the transmission channel estimation values per pilot block, where the weighted average is calculated over the "2k" slots and the weights are determined in accordance with the state of a transmission channel;
   multi-pilot block transmission channel estimation means for obtaining the transmission channel estimation values for the m-th information symbol in the n-th slot, on the basis of the weighted average where "m" is a non-negative integer; and
   transmission channel fluctuation compensation means for compensating the transmission channel fluctuation of the m-th information symbol in the n-th slot, on the basis of the transmission channel estimation values obtained by the multi-pilot block transmission channel estimation means,
   wherein said weight determination means narrows the range of dominant weights, when the transmission channel is unstable, while it enlarges the range of dominant weights, when the transmission channel is stable.

2. A decoding apparatus for direct sequence spread spectrum signal for CDMA which comprises:
   memory means for storing "2k" pilot blocks from (n−(k−1))-th pilot block to (n+k)-th pilot block which includes a plurality of pilot symbols in a sequence of slots, where "n" is a non-negative integer and "k" is a positive integer;
   pilot symbol averaging means for averaging a plurality of received channels at a plurality of the pilot symbols in a slot;
   weight determination means for determining the weights which are used for obtaining a weighted average of the transmission channel estimation values per pilot block, where the weighted average is calculated over the "2k" slots and the weights are determined in accordance with the state of a transmission channel;
   multi-pilot block transmission channel estimation means for obtaining the transmission channel estimation values for the m-th information symbol in the n-th slot, on the basis of the weighted average where "m" is a non-negative integer; and
   transmission channel fluctuation compensation means for compensating the transmission channel fluctuation of the m-th information symbol in the n-th slot, on the basis of the transmission channel estimation values obtained by the multi-pilot block transmission channel estimation means,
   wherein said weight determination means decreases the weights for the slots which go ahead specific slots of which states fluctuate greatly.

3. A decoding method for direct sequence spectrum spread signal for CDMA which comprises the steps of:
   storing "2k" pilot blocks from (n−(k−1))-th pilot block to (n+k)-th pilot block which includes a plurality of pilot symbols in a sequence of slots, where "n" is a non-negative integer and "k" is a positive integer;
   averaging a plurality of received channels at a plurality of the pilot symbols in a slot;
   determining the weights which are used for obtaining a weighted average of a transmission channel estimation values per pilot block, where the weighted average is calculated over the "2k" slots and the weights are determined in accordance with the state of a transmission channel;
   obtaining transmission channel estimation values for the m-th information symbol in the n-th slot, on the basis of the weighted average where "m" is a non-negative integer; and compensating the transmission channel fluctuation of the m-th information symbol in the n-th slot, on the basis of the transmission channel estimation values, wherein, in the determining step, the range of dominant weights is narrowed, when the transmission channel is unstable, while it is enlarged, when the transmission channel is stable.

4. A decoding method for direct sequence spectrum spread signal for CDMA which comprises the steps of:

storing "2k" pilot blocks from (n−(k−1))-th pilot block to (n+k)-th pilot block which includes a plurality of pilot symbols in a sequence of slots, where "n" is a non-negative integer and "k" is a positive integer;

averaging a plurality of received channels at a plurality of the pilot of symbols in a slot;

determining the weights which are used for obtaining a weighted average of a transmission channel estimation values per pilot block, where the weighted average is calculated over the "2k" slots and the weights are determined in accordance with the state of a transmission channel;

obtaining transmission channel estimation values for the m-th information symbol in the n-th slot, on the basis of the weighted average where "m" is a non-negative integer; and compensating the transmission channel fluctuation of the m-th information symbol in the n-th slot, on the basis of the transmission channel estimation values, wherein, in the determining step, the weights are decreased for the slots which go ahead specific slots of which states fluctuate greatly.

* * * * *